Figure 1:
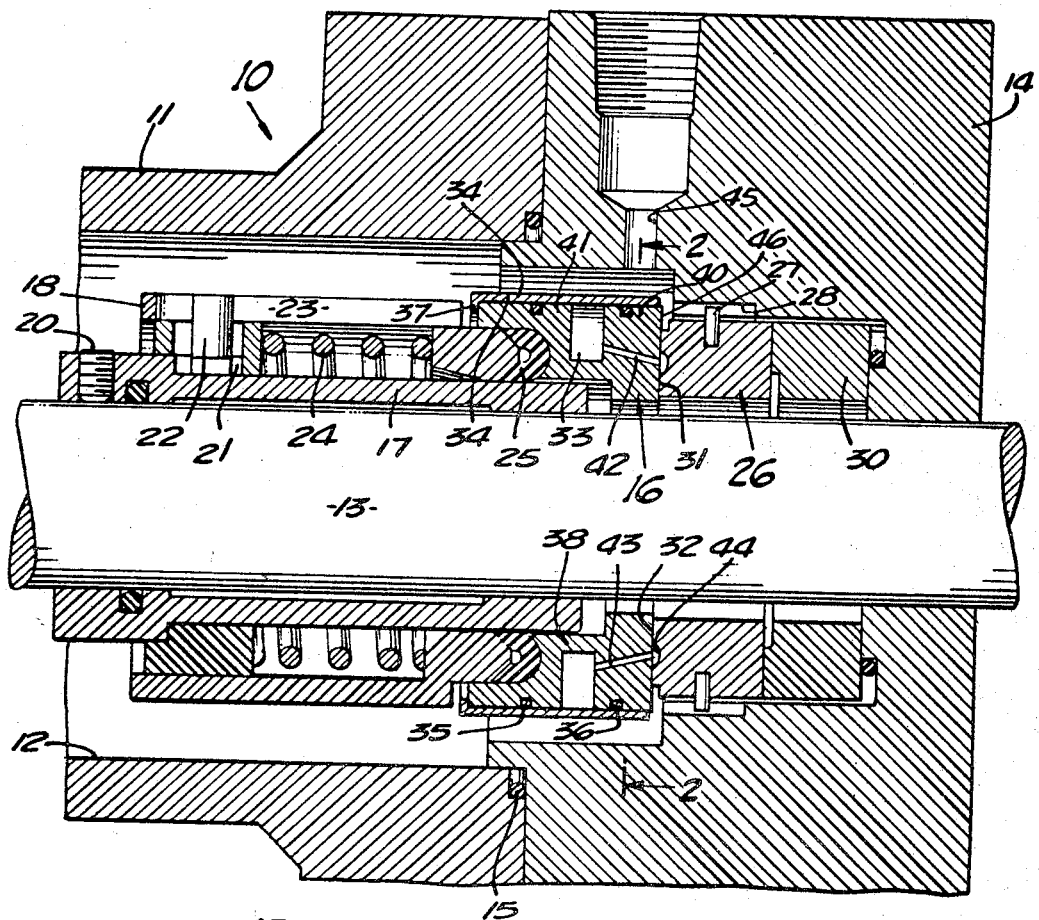

March 18, 1969  W. J. WIESE  3,433,489

MECHANICAL SEAL WITH FLOW CONTROL

Original Filed Feb. 27, 1964

INVENTOR.
WINFRED J. WIESE
BY
ATTORNEY

United States Patent Office 3,433,489
Patented Mar. 18, 1969

3,433,489
MECHANICAL SEAL WITH FLOW CONTROL
Winfred J. Wiese, Whittier, Calif., assignor to Borg-Warner Corporation, Chicago, Ill., a corporation of Illinois
Continuation of application Ser. No. 347,719, Feb. 27, 1964. This application Dec. 27, 1966, Ser. No. 605,084
U.S. Cl. 277—74                              3 Claims
Int. Cl. F16j 15/38, 15/40

This application is a continuation of application Ser. No. 347,719, filed Feb. 27, 1964, now abandoned.

The present invention relates, in general, to mechanical seals for sealing a rotatable shaft in a housing or the like to prevent escape of fluid, which is under pressure in the housing, out along the shaft, and relates in particular to improved mechanical seals incorporating means for regulating and maintaining a fluid flow and pressure gradient across the seal faces of the mechanical seal over a wide range of fluid pressures in the housing.

Mechanical seals, or rotary seals as they are sometimes called, usually comprise parts, such as a ring, held stationary with repect to the housing, and parts, such as another ring, fixed for rotation on or with the shaft which rotates in the housing. Each sealing part, sometimes called sealing elements or means, may comprise one or more rings, and each sealing part is provided with a face which opposes a face of another sealing means and arranged so that, in response to either fluid pressure or spring pressure, or both, there is a sealing relationship between the opposed faces (sometimes called sealing faces) to form a seal to prevent leakage out along the shaft. This sealing relationship, however, does not mean that the opposing faces are necessarily in direct contacting relationship with each other, especially over their entire faces, but means that a small lubricating film of fluid is permitted between these sealing faces to prevent or reduce (in the case of metal rings) direct metal-to-metal contact therebetween. This lubricating film is usually made up of the fluid being sealed and reduces wear and/or seizure of the sealing faces. As a matter of fact, this leakage of fluid past the sealing faces is necessary to the proper operation of mechanical seals and such seals are designed to reduce this leakage to a minimum yet not prevent it entirely during normal operation of the seal so that a film of fluid is maintained for lubricating and for its cooling effect on its opposed sealing faces.

Heretofore it has been difficult to maintain this film of fluid over a wide range of fluid pressures in the housing and this invention pertains to a means of overcoming this difficulty.

Accordingly, the principal object of this invention is to improve mechanical seals by incorporating means for regulating and maintaining a flow and pressure gradient of fluid across sealing faces so that the mechanical seal operates over a wide range of pressures.

Briefly, the principal object of this invention is accomplished by providing a groove or collector ring in one or the other, or both, of the opposed sealing faces in the path of flow or leakage of the fluid which lubricates the sealing faces and communicating this collector ring or groove to a pressure groove or chamber provided in one of the sealing rings. Fluid flowing past the seal faces will be collected in the collector groove and flow into the pressure chamber and, under certain operating conditions later to be described, will build up a fluid pressure therein. The fluid pressure that builds up in this pressure chamber controls the flatness of the sealing face on the ring having the pressure chamber. This flatness, in turn, regulates the amount of leakage past the sealing faces.

Expressed in another way, the objects of the invention may be realized in an assembly for sealing a rotating shaft within a housing including seal means within the housing to prevent the flow of fluid along the shaft outwardly of the housing, the seal means including a part that rotates with the shaft and a part that is stationary in the housing, these parts having opposed sealing faces which permit some fluid to flow therebetween to cool and lubricate the faces, and means responsive to the pressure of the fluid to control the amount of fluid flowing between the sealing faces. The last mentioned means includes, in one of the foregoing parts, a unitary sealing ring having a front portion providing one of the sealing faces and further providing an area extending generally radially outwardly from said one sealing face, this area being exposed to the fluid in the housing, a back portion axially spaced from the front portion, and a neck of smaller diameter than the front portion joining the front portion to the back portion, a closure ring spaced radially outwardly from the neck and sealed to the front and back portions to provide, with the front and back portions and the neck, a pressure chamber. The front portion is free to deflect with respect to the rest of the unitary sealing ring in response to variations in the fluid pressure in the pressure chamber and variations in the fluid pressure acting on the one sealing face and on the generally radially outwardly extending area, thereby to distort the one sealing face. Means are provided for establishing fluid communication between the pressure chamber and the opposed sealing faces.

Accordingly, a more specific object of this invention is to provide a collector groove and a pressure chamber in a mechanical seal which operate to control the flatness of one of the sealing faces so that the flow of fluid across the seal faces is controlled.

Figure 2:
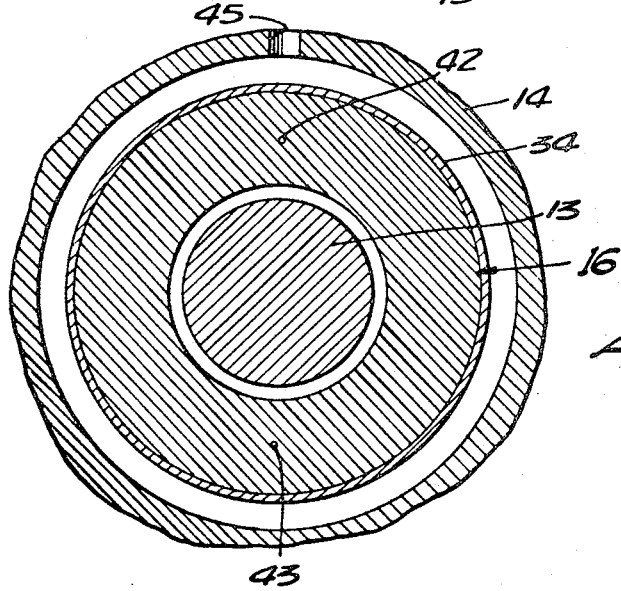

These and other objects of this invention will become apparent from the following description when taken in connection with the accompanying drawings in which:

FIGURE 1 is a longitudinal sectional view of a mechanical seal constructed in accordance with the teachings of this invention illustrating to advantage the means for controlling and regulating the flow of fluid across the sealing faces; and FIGURE 2 is a fragmentary cross-sectional view taken along line 2—2 of FIGURE 1 and looking in the direction of the arrows.

In the drawings, a mechanical or rotary seal is illustrated in its entirety as 10 and comprises a housing 11 formed as part of another housing, such as a pump, in which fluid is being pumped under pressure and having a counterbore 12 in which is disposed a rotatable shaft 13 in spaced relationship therewith. The fluid under pressure in the counterbore is at some value equal to or less than the pressure at which the pump is operating, but at a value higher than atmospheric pressure.

The housing 11 has a flange 14 suitably attached thereto and provided with sealing means, such as O-ring seals 15, where necessary.

A rotatable sealing ring 16 is suitably attached to shaft 13 for rotation therewith. The attaching means for the sealing ring 16, as specifically illustrated in this embodiment, comprises a sleeve 17 which fits over the shaft 13 and over which a cup-like spring holder 18 is telescoped. Sleeve 17 is affixed to the shaft by any suitable means, such as threaded pins 20, and spring holder 18 is fixed for rotation with sleeve 17 by means of slots 21 in the sleeve 17 and in which are fitted pins 22 which extend radially outwardly through longitudinal slots 23 in the spring holder. The sleeve 17 provides a means for adjustably fitting the spring holder 18 to the shaft to accommodate variations in the size of the spring holder and the shaft in accordance with good engineering practice. The spring holder is subject to the action of the helical spring 24 which encompasses the sleeve 17 and urges the cup-like seal 25 and sealing ring 16 towards a stationary sealing ring 26 in the conventional manner. Slots 23 permit limited axial movement of the sealing ring 16 and serve to react with the pins 22 to rotate the sealing ring with the shaft.

The non-rotatable sealing ring 26 is held in the housing 11 against rotation in any suitable manner as by pin 27 engaged in a slot 28 in the flange 14. In this embodiment the stationary sealing ring 26 is also provided with a backup ring 30.

It is to be understood that the means for attaching the rotating sealing ring 16 to the shaft and the means for attaching the non-rotating sealing ring 26 to the housing may vary, such means as disclosed herein being one practical embodiment of such means to illustrate such attaching means in its broadest sense.

From the above description, it can be seen that fluid under pressure from the remainder of the housing, viz., a pump housing or the like, is permitted to flow into the bore 12 but is prevented from leaking along the shaft by the sealing rings 16 and 26 by reason of the operation of the sealing ring 16 which has a radial face 31 and sealing ring 26 which has a radial face 32 which opposes face 31 to form sealing faces.

As previously mentioned, the use of rotary seals has been dependent upon the lubricating and cooling ability of the fluid being sealed. The rotating and non-rotating rings, being usually of different material such as a hard metal like Stellite, on the one hand, or a carbon or soft metal like bronze, on the other, will wear quite rapidly when in contacting relationship even when the sealing faces are lapped optically flat. To prevent or reduce this wear as much as possible, leakage of minute amounts is not only desirable but necessary for proper operation of these seals.

Thus, there will be a flow of the fluid being pumped from the high pressure side of the mechanical seal in counterbore 12 to the low pressure side in along the shaft exposed to the atmosphere or a zone of low pressure and the means for regulating and maintaining this flow and regulating the pressure gradient or the pressure drop across the seal faces so that the mechanical seal operates over a range of pressures is the primary purpose of this invention and how this is accomplished will now be described.

In FIGURE 1, it can be seen that sealing ring 16 is provided with a pressure chamber 33 formed, in the embodiment disclosed, by a peripheral groove cut into the sealing ring 16 and by a closure ring 34 which surrounds the circumference of the sealing means. Leakage from the pressure chamber 33 is prevented by suitable sealing means, such as O-ring seals 35 and 36 disposed in the sealing ring 16 against the closure ring in a conventional manner. Closure ring 34 is provided with a flange 37 turned down over the end of the sealing ring on the edge spaced away from the sealing face 31 thereof. The pressure chamber 33 formed in the sealing ring 16 as disclosed, provides a relatively thin neck 38 at the bottom of the chamber 33 which serves to connect the front portion 40 with the back portion 41. Thus, the closure ring 34 overlaps both portions as clearly illustrated in FIGURE 1. Sealing ring 16 is provided with a plurality of bores or holes (two only illustrated) at 42 and 43 which communicate the pressure chamber 33 with a groove or collector ring 44 formed in the sealing face 32 of the sealing ring 26 and shown substantially midway between the outer and inner periphery of sealing face 32 for purposes of illustration herein. Thus, fluid under pressure in the counterbore 12 flowing towards the shaft 13 along the sealing faces 31 and 32 will collect in the collector ring 44 and be in communication with the pressure chamber 33. Part of this flow will, of course, flow on towards the shaft to maintain proper lubrication of the sealing faces as aforementioned.

From the above description it can be seen that the collector ring 44 being in the path of flow of the fluid from the counterbore 12 towards the shaft 13, will be responsive to the pressure thereat and communicate this pressure to the chamber 33. Actually, the location of the collector ring radially between the inner and outer peripheries of the sealing faces will determine the pressure differential between the chamber 33 and the counterbore 12; this differential in pressure will be referred to hereinafter.

As soon as pressure is introduced into the counterbore 12 from a source of pressure such as the outlet side of the pump in which this mechanical seal is incorporated, through the passage 45 in the flange 14, the force due to this pressure acting on the sealing face 31 of the body portion 40 at area 46; that is, the area radially outwardly of the outer periphery of the opposing sealing face 32, will deflect this area 46 and perhaps some or all of the area of sealing face 31 to the left (as shown in the drawings); that is, away from its opposed sealing face 32, so that there is an opening, perhaps wedge-shaped, between the sealing faces to establish a flow toward the shaft. This deflection or distortion of sealing face 31 is due to the fact that initially; that is, upon the starting operation, there is no pressure in chamber 33, and thus the differential pressure acting on area 46 is high, causing the neck 38 to bend and perhaps the body portion 40 to deflect in shear. This bending or shearing, as the case may be, causes a pressure build-up in the collector ring 44 which is communicated through the passages 42 and 43 to the pressure chamber 33. As the pressure builds up or increases in the pressure chamber 33, it tends to reduce (but not completely eliminate) the opening, or reduce the amount of wedge relationship between the opposed sealing faces by opposing the pressure force acting on area 46, thus tending to equalize or reduce the differential pressure acting on area 46. This reduces the bending or shearing stresses and reduces the strain that would occur on body 40 without such a feed-back or counterforce available in chamber 33. With such a reduction in the differential pressure acting on area 46, the flow across the faces 31, 32 is consequently reduced from the initial flow caused by the initial increase in pressure in counterbore 12 to some lesser value, although higher than it was before the increase in pressure in counterbore 12.

Thus, the pressure in chamber 33 and the pressure in counterbore 12 acting on area 46 will establish a static relationship and remain in equilibrium. Any further increase in pressure in the counterbore 12 will be reflected by a further distortion of the body 40 and an increase in pressure in chamber 33—a repetition of the operation as described above—tending to increase the flow between the faces 31, 32; this flow being higher than before because of the increase in pressure in counterbore 12 but less than it would be without the pressure acting in chamber 33.

Contrariwise, decreases in pressure in counterbore 12 will tend to cause less flow between the faces 31, 32, permitting the faces to become more planar in their relationship. The decrease in pressure in counterbore 12 will, of course, cause the higher pressure in chamber 33 to decrease or bleed off back through the collector ring, ultimately causing the static relationship of pressure flow across the sealing faces to become established.

From the above description it can be seen that the arrangement described incorporates a means for regulating and maintaining fluid flow and pressure gradient across the sealing faces. Heretofore, increases in pressure could sometimes stop the flow across the sealing faces, thus causing damage to the seal; whereas with this arrangement, increases in pressure in the counterbore 12 make the flow across the sealing faces more responsive in a linear relationship so as to correctly reflect such changes in pressure for proper operation.

While the various parts herein may have been described as upper and lower or in a right or left position, such description refers only to the relative position of

I claim:

1. An assembly for sealing a rotating shaft within a housing comprising seal means adapted to be disposed within said housing to prevent the flow of fluid along the shaft outwardly of the housing, said seal means including a part adapted to rotate with the shaft and a part adapted to be stationary in the housing, said parts having opposing generally annular sealing faces which permit some fluid to flow therebetween to cool and lubricate said faces, and means responsive to the pressure of said fluid to control the amount of fluid flowing between said sealing faces, said last mentioned means comprising, in one of said parts, a unitary sealing ring having a front portion providing one of said annular sealing faces and defining inner and outer peripheries thereof, said portion further providing an area extending generally radially outwardly from said one sealing face, said area being adapted to be exposed to the fluid in said housing, a back portion axially spaced from said front portion, and a neck of smaller diameter than said front portion joining said front portion to said back portion, a closure ring spaced radially outwardly from said neck and sealed to said front portion and said back portion to provide, with said back portion and said neck, a pressure chamber, said front portion being free to deflect with respect to said unitary sealing ring in response to variations in the fluid pressure in said pressure chamber and variations in fluid pressure acting on said one sealing face and on said generally radially outwardly extending area to thereby distort said sealing face, and means defining at least one bore in said front portion of said unitary sealing ring, said bore having an open end at said pressure chamber and an end open at said sealing face of said ring intermediate said inner and outer periphery thereof to establish fluid communication between said pressure chamber and said sealing faces.

2. An assembly for sealing a rotating shaft within a housing as claimed in claim 1 wherein said unitary sealing ring is adapted to rotate with the shaft, said back portion and said front portion have the same diameter, said closure ring is cylindrical and closely surrounds the outer peripheries of said front portion and said back portion, and O ring seals are employed to seal said closure ring to said front portion and to said back portion.

3. An assembly for sealing a rotating shaft within a housing as defined in claim 1 wherein one of said sealing faces includes collector ring means said collector ring means being in communication with said bore means.

References Cited

UNITED STATES PATENTS 2,930,636   3/1960   Tracy.

LAVERNE D. GEIGER, *Primary Examiner.*

JEFFREY S. MEDNICK, *Assistant Examiner.*

U.S. Cl. X.R.

277—27, 75, 91, 93